May 22, 1945.  E. H. NELSON ET AL  2,376,552
MACHINE TOOL CONTROLLER
Filed Dec. 20, 1943
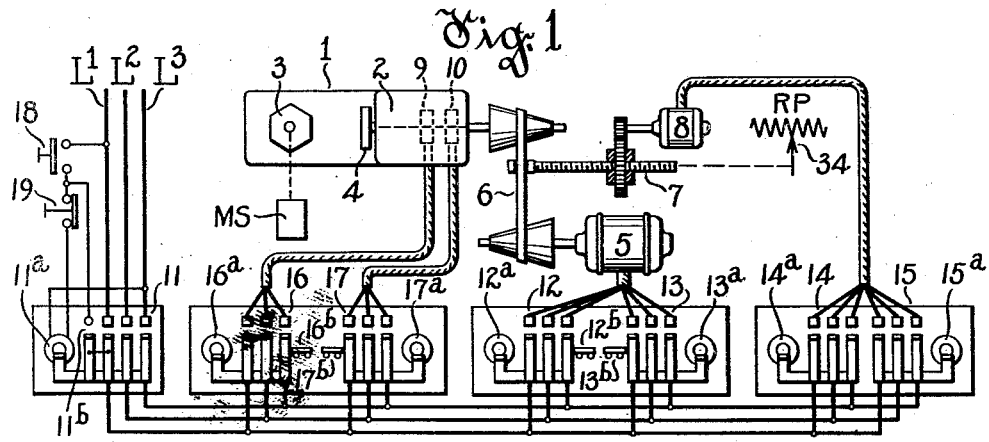
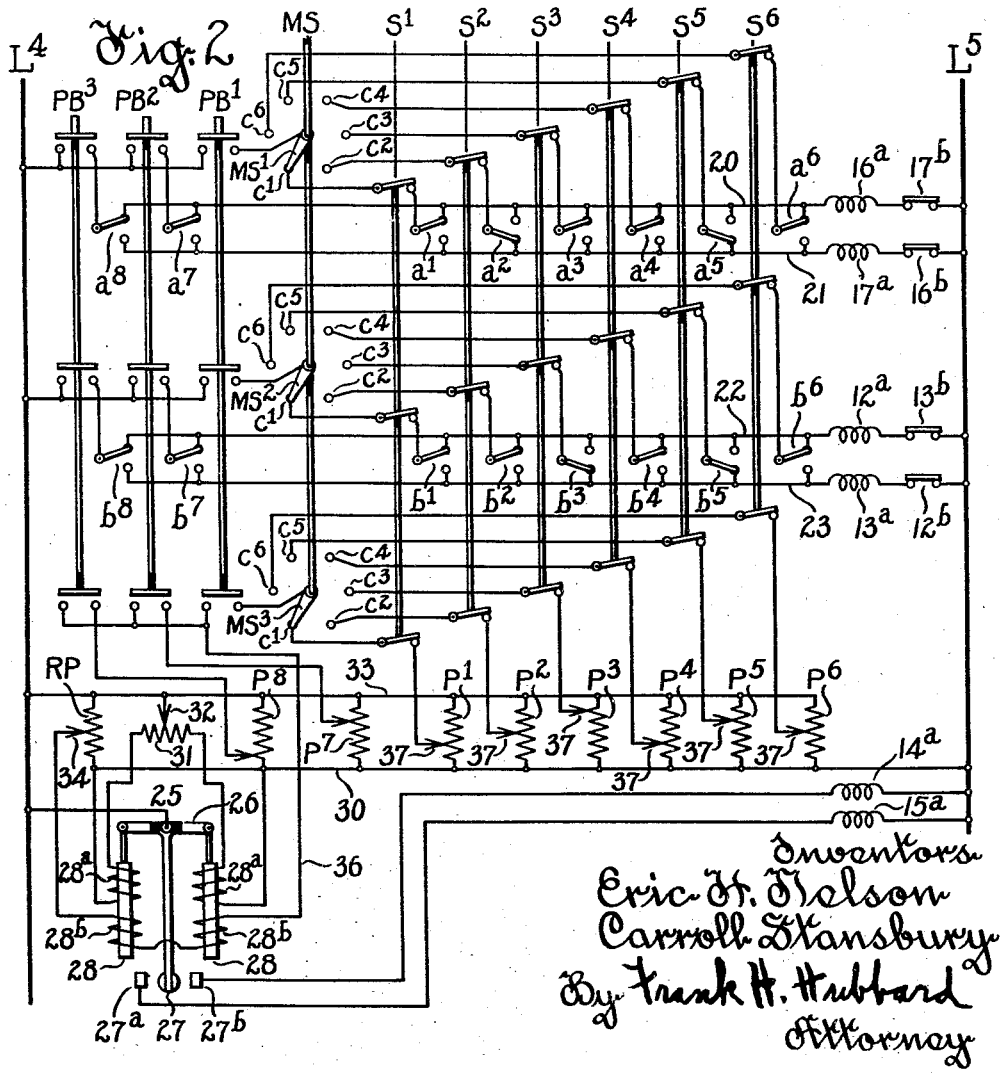
Inventors
Eric H. Nelson
Carroll Stansbury
By Frank H. Hubbard
Attorney Patented May 22, 1945

2,376,552

UNITED STATES PATENT OFFICE 2,376,552

MACHINE TOOL CONTROLLER

Eric H. Nelson, Forest Hills, N. Y., and Carroll Stansbury, Chevy Chase, Md., assignors to Cutler-Hammer, Inc., Milwaukee, Wis., a corporation of Delaware Application December 20, 1943, Serial No. 515,062

3 Claims. (Cl. 29—64)

This invention relates to machine tool controllers, and while not limited thereto is particularly applicable to controllers for machine tools such as turret lathes.

The invention has among its objects to provide a controller for programming the operation of a machine tool such as a turret lathe to cause automatic operation thereof at a preselected speed and in a preselected direction for each of a plurality of operative steps constituting a complete work cycle of the machine.

Another object is to provide a controller of the above character which is positive and reliable in operation, which is flexible in character and readily adjustable to change the character of the cycle controlled thereby and which consists of a relatively small number of simple and inexpensive control elements which can be readily embodied in a compact and unitary controller.

The invention also resides in novel control features by means of which the speed of the machine tool is preselected for each operative step and automatically changed from one preselected speed to another preselected speed upon operation of the machine through its work cycle.

Various other objects and advantages of the invention will hereinafter appear.

The accompanying drawing illustrates an embodiment of the invention which will now be described, it being understood that various modifications may be made in the embodiment illustrated without departing from the spirit and scope the appended claims.

In the drawing,

Figure 1 diagrammatically illustrates an electrically operated turret lathe and switches for controlling the operation thereof, and Fig. 2 diagrammatically illustrates a selector control for the switches shown in Fig. 1.

Referring to Fig. 1, the same illustrates a turret lathe 1 having a head stock 2 and a rotatable six-position turret 3. The spindle 4 of head stock 2 is driven by a motor 5 through the medium of a conventional variable speed cone drive 6 having a speed adjusting element 7 which is operable by a motor 8. The turret lathe is also provided with a suitable back gear mechanism (not shown) which is controlled by electromagnetic clutches 9 and 10 to provide for low or high speed operation of spindle 4.

Motors 5 and 8 and clutches 9 and 10 are supplied with power from a 3 phase alternating current circuit indicated by lines $L^1$, $L^2$, $L^3$ through the medium of an electromagnetic main switch 11, and motor 5 is controlled by a pair of electromagnetic reversing switches 12 and 13; motor 8 is controlled by a pair of electromagnetic reversing switches 14 and 15 and the clutches 9 and 10 are respectively controlled by electromagnetic switches 16 and 17. Each of the aforementioned switches is normally open and is provided with an operating winding $a$ for effecting closure thereof. Also for a purpose hereinafter set forth each of the switches 12, 13, 16 and 17 is provided with a set of normally closed auxiliary contacts $b$.

Main switch 11 is controlled by a normally open start push button 18 and a normally closed stop push button 19. Upon closure of start push button 18, operating winding $11^a$ is connected across lines $L^1$, $L^3$ for closure of said main switch and upon release of said start push button said operating winding is maintained energized through the medium of stop push button 19 and contacts $11^b$ associated with said main switch. Closure of main switch 11 establishes circuit from lines $L^1$, $L^2$, $L^3$ to control switches 12 to 17, and depression of stop push button 19 interrupts the maintaining circuit of operating winding $11^a$ for opening of said main switch.

Referring now to Fig. 2, the same illustrates the operating windings of switches 12 to 17 and an alternating current supply circuit therefor indicated by lines $L^4$, $L^5$. This figure also illustrates an automatic controller for said switches including a master switch MS which is operated by rotation of turret 3 either mechanically by a suitable flexible coupling or electrically by a synchronous drive commonly known as a "Selsyn" drive. As shown, said master switch is provided with three rotatable switch elements $MS^1$, $MS^2$ and $MS^3$, each of which is provided with six cooperating stationary contacts $c^1$ to $c^6$ corresponding to the six operative positions of turret 3.

A 3 pole push button switch $PB^1$ is provided for establishing circuit to switch elements $MS^1$, $MS^2$ and $MS^3$ to render the master switch operative for automatic control of the turret lathe. Also a plurality of 3 pole switches $S^1$ to $S^6$ are provided for establishing circuit from contacts $c^1$ to $c^6$ of switch element $MS^1$ to selector switches $a^1$ to $a^6$, respectively; from contacts $c^1$ to $c^6$ of selector switch $MS^2$ to selector switches $b^1$ to $b^6$, respectively; and from contacts $c^1$ to $c^6$ of switch element $MS^3$ to selector potentiometer rheostats $P^1$ to $P^6$, respectively. Each of the selector switches $a^1$ to $a^6$ has two operative positions, one for establishing circuit to a conductor 20, and the other for establishing circuit to a conductor 21.

Also each of the selector switches $b^1$ to $b^6$ has two operative positions, one for establishing circuit to a conductor 22, and the other for establishing circuit to a conductor 23. Operating winding 16$^a$ of clutch control switch 16 is connected between conductor 20 and line $L^5$ through the medium of auxiliary contacts 17$^b$ and operating winding 17$^a$ of clutch control switch 17 is connected between conductor 21 and line $L^5$ through the medium of auxiliary contacts 16$^b$. Operating winding 12$^a$ of reversing switch 12 is connected between conductor 22 and line $L^5$ through the medium of auxiliary contacts 13$^b$ and operating winding 13$^a$ of reversing switch 13 is connected between conductor 23 and line $L^5$ through the medium of auxiliary contacts 12$^b$.

Assuming that push button switch PB$^1$ and switches $S^1$ to $S^6$ are in closed position, it is apparent that in each of the operative positions of turret 3 one of the selector switches $a$ is connected to line $L^4$ by master switch element MS$^1$ and one of the selector switches $b$ is connected to line $L^4$ by master switch elements MS$^2$. Thus depending upon the setting of selector switches $a^1$ to $a^6$ and $b^1$ to $b^6$ one or the other of the switches 16 or 17 and one or the other of the switches 12 or 13 are energized in each of the operative positions of turret 3. Accordingly selector switches $a^1$ to $a^6$ may be preset to effect control of clutches 9 and 10 for either low speed or high speed operation of spindle 4 in each of the operative positions of turret 3 and selector switches $b^1$ to $b^6$ may be preset to effect control of motor 5 for operation of spindle 4 in a selected direction in each of the operative positions of said turret.

As will now be set forth, reversing switches 14 and 15 are controlled through the medium of the selector potentiometer rheostats $P^1$ to $P^6$ to effect control of motor 8 for a preselected setting of cone drive 6 in each of the operative positions of turret 3. As shown in Fig. 2, the operating windings 14$^a$ and 15$^a$ of reversing switches 14 and 15 are controlled by a relay 25 comprising a horizontally disposed lever 26 which is pivoted intermediate its ends and provided with a downwardly extending contact arm 27. Arm 27 is biased toward an intermediate neutral position and is movable in opposite directions out of such position into engagement with stationary contacts 27$^a$ and 27$^b$ to thereby connect one or the other of the operating windings 14$^a$ or 15$^a$ across lines $L^4$, $L^5$. Lever 26 has cores 28 secured to opposite ends thereof and each of said cores is surrounded by a pair of stationary magnet coils 28$^a$ and 28$^b$. Each of the magnet coils 28$^a$ has one terminal connected to a conductor 30 extending from line $L^5$ and the opposite terminals of said windings are connected to opposite ends of a rheostat 31 having an adjustable contact 32 which is connected to a conductor 33 extending from line $L^4$. Coils 28$^a$ are wound so that the polarity thereof is in the same direction and the contact 32 of rheostat 31 is adjusted to render the operating force of said coils of equal value. The coils 28b are wound in opposite directions with respect to each other so that current flowing therethrough unbalances the pull on the two cores 28 to cause rotation of contact arm 27 in one direction or the other dependent upon the direction of the current in said coils. Coils 28$^b$ are connected in series between a conductor 36 and the adjustable contact 34 of a receiver potentiometer rheostat RP and with push button switch PB$^1$ in closed position conductor 36 is connected to the master switch element MS$^3$. Rheostat RP is connected between conductors 33 and 30 and as illustrated in Fig. 1 the contact 34 of said rheostat is operatively connected to the adjusting element 7 of cone drive 6 so that the potential of said contact with respect to lines $L^4$, $L^5$ is determined by the speed setting of cone drive 6. The several selector potentiometer rheostats $P^1$ to $P^6$ are connected between conductors 30 and 33 and with switches $S^1$ to $S^6$ in closed position the adjustable contacts 37 of said rheostats are respectively connected to contacts $c^1$ to $c^6$ of master switch element MS$^3$.

With push button switch PB$^1$ and switches $S^1$ to $S^6$ in closed position, master switch element MS$^3$ acts in each of the operative positions of turret 3 to establish circuit from coils 28$^b$ of relay 25 to one of the selector rheostats $P^1$ to $P^6$. Upon establishment of circuit between coils 28$^b$ and any one of the selector rheostats P, as for example selector rheostat $P^2$, no current will flow through said coils if selector rheostat $P^2$ and receiver rheostat RP are in corresponding positions. However, if said rheostats are not in corresponding positions current will flow through coils 28$^b$ either from contact 34 of receiver rheostat RP to contact 37 of selector rheostat $P^2$ or in a reverse direction between said contacts depending upon whether selector rheostat $P^2$ is set higher or lower than receiver rheostat RP. Thus depending upon the direction of current in coils 28$^b$ contact arm 27 is operated to energize one or the other of the reversing switches 14 or 15 for operation of motor 8 in a direction to bring contact 34 of receiver rheostat RP into a position corresponding to the setting of contact 37 of selector rheostat $P^2$. Coils 28$^b$ are then deenergized and contact arm 27 returns to normal position to effect stopping motor 8. Thus it is apparent that the several selector rheostats $P^1$ to $P^6$ may be preset to cause operation of motor 8 for a selected speed setting of cone drive 6 in each of the operative positions of turret 3.

The controller illustrated in Fig. 2 is provided with additional normally open push button control switches PB$^2$ and PB$^3$. These push button switches and the push button switch PB$^1$ are preferably provided with a suitable interlocking mechanism (not shown) of the type commonly employed in push button controlled radio sets to insure opening of any one of the push buttons upon depression of another. Push button PB$^2$ when closed establishes circuit from line $L^4$ to selector switches $a^7$ and $b^7$ and also establishes circuit from conductor 36 to a selector potentiometer rheostat $P^7$. Push button PB$^3$ when closed establishes circuit from line $L^4$ to selector switches $a^8$ and $b^8$ and also establishes circuit from conductor 36 to a selector potentiometer rheostat $P^8$. Each of the selector swiches $a^7$ and $a^8$ has two operative positions, one for establishing circuit to conductor 20 and the other for establishing circuit to conductor 21 and each of the selector switches $b^7$ and $b^8$ also has two operative positions, one for establishing circuit to conductor 22 and the other for establishing circuit to conductor 23. The potentiometer rheostats $P^7$ and $P^8$ are each connected between conductors 30 and 33.

Upon depression of either of the pushbuttons PB$^2$ or PB$^3$ push button switch PB$^1$ is moved into open position to render the master switch MS inoperative. Push buttons PB$^2$ or PB$^3$ may thus be operated at any point in the operating cycle of the turret lathe to discontinue automatic control of the lathe by master switch MS. As is apparent from the foregoing, upon depression of push button PB² the direction and speed of operation of the lathe spindle is determined by the setting of selector switches $a^7$, $b^7$ and potentiometer rheostat $P^7$, and upon depression of push button PB³ the direction and speed of operation of said spindle is determined by the setting of selector switches $a^8$ and $b^8$, and potentiometer rheostat $P^8$.

What we claim as new and desire to secure by Letters Patent is:

1. The combination with a motor driven speed change device for a machine tool requiring speed control of a part of the machine for each of a number of progressive machining operations, of control means for said motor driven speed change device, comprising presettable potentiometers individualized to the progressive machining operations, an adjustable potentiometer operatively associated with said speed change device, and means to render each of said presettable potentiometers and the last mentioned potentiometer cooperative to effect for the corresponding machining operation the adjustment of said speed change device required for a speed of said machine part determined by the adjustment of the then acting presettable potentiometer.

2. The combination with a speed change device associated with a machine tool element requiring speed control for each of a plurality of machining operations, of control means for said speed change device comprising an electromagnetic relay responsive to effect adjustment thereof, a plurality of adjustable speed selecting potentiometers each corresponding to one of said machining operations, a potentiometer adjustable by said speed change device and means for subjecting said relay to control jointly by said last mentioned potentiometer, and any one of said speed selecting potentiometers to effect required adjustment of said speed change device for operation of said element during any of said machining operations at a speed determined by the setting of the corresponding speed selecting potentiometer.

3. The combination with a speed change device associated with a machine tool element requiring speed control for each of a plurality of machining operations, of control means for said speed change device comprising an electromagnetic relay responsive to effect adjustment thereof, an alternating current supply circuit, a plurality of adjustable speed selecting potentiometers connected across said supply circuit and each corresponding to one of said machining operations, a potentiometer adjustable by said speed change device and also connected across said supply circuit, and means for establishing a bridging control circuit for said relay between said last mentioned potentiometer and any one of said speed selecting potentiometers to render said relay operative to effect required adjustment of said speed change device for operation of said element during any one of said machining operations at a speed determined by the setting of the corresponding speed selecting potentiometer.

ERIC H. NELSON.
CARROLL STANSBURY.